(12) United States Patent
Donaldson et al.

(10) Patent No.: US 10,639,841 B2
(45) Date of Patent: May 5, 2020

(54) SYSTEM AND METHOD FOR OPERATING A THREE-DIMENSIONAL PRINTER TO COMPENSATE FOR RADIAL VELOCITY VARIATIONS

(71) Applicant: Xerox Corporation, Norwalk, CT (US)

(72) Inventors: Patricia J. Donaldson, Pittsford, NY (US); Jeffrey J. Folkins, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 288 days.

(21) Appl. No.: 15/646,725

(22) Filed: Jul. 11, 2017

(65) Prior Publication Data

US 2017/0305138 A1    Oct. 26, 2017

Related U.S. Application Data

(62) Division of application No. 14/508,174, filed on Oct. 7, 2014, now Pat. No. 9,751,259.

(51) Int. Cl.
| | |
|---|---|
| *B29C 67/00* | (2017.01) |
| *B29C 64/106* | (2017.01) |
| *B29C 64/209* | (2017.01) |
| *B29C 64/227* | (2017.01) |
| *B33Y 30/00* | (2015.01) |
| *B29C 64/00* | (2017.01) |
| *B29C 64/112* | (2017.01) |

(52) U.S. Cl.
CPC ............ *B29C 64/106* (2017.08); *B29C 64/00* (2017.08); *B29C 64/112* (2017.08); *B29C 64/209* (2017.08); *B29C 64/227* (2017.08); *B33Y 30/00* (2014.12)

(58) Field of Classification Search
CPC ....... B29C 64/112; B33Y 10/00; B33Y 30/00; B33Y 50/00
See application file for complete search history.

(56) References Cited

U.S. PATENT DOCUMENTS

| | | | |
|---|---|---|---|
| 6,264,295 B1 * | 7/2001 | Bradshaw | B41J 3/407 347/12 |
| 7,500,846 B2 | 3/2009 | Eshed et al. | |
| 7,962,237 B2 | 6/2011 | Kritchman | |
| 9,751,259 B2 * | 9/2017 | Donaldson | B33Y 30/00 |
| 2004/0017424 A1 * | 1/2004 | Koguchi | B41J 3/4071 347/40 |
| 2004/0252174 A1 * | 12/2004 | Baxter | B41J 3/4073 347/101 |
| 2004/0265413 A1 * | 12/2004 | Russell | B41J 2/16532 425/375 |
| 2007/0222844 A1 | 9/2007 | Ando et al. | |
| 2010/0121476 A1 | 5/2010 | Kritchman | |

* cited by examiner

*Primary Examiner* — Galen H Hauth
(74) *Attorney, Agent, or Firm* — Maginot Moore & Beck LLP

(57) ABSTRACT

A three-dimensional object printer is configured to enable the density of material ejected by at least one printhead onto a rotating platen near its circumferential edge to be approximately the same as the density of the material ejected onto the rotating platen near the center of the platen.

15 Claims, 4 Drawing Sheets

SYSTEM AND METHOD FOR OPERATING A THREE-DIMENSIONAL PRINTER TO COMPENSATE FOR RADIAL VELOCITY VARIATIONS

PRIORITY CLAIM

This application is a divisional application of U.S. patent application Ser. No. 14/508,174, which is entitled System And Method For Operating A Three-Dimensional Printer To Compensate For Radial Velocity Variations, which was filed on Oct. 7, 2014, and which issued as U.S. Pat. No. 9,751,259 on Sep. 5, 2017.

TECHNICAL FIELD

This disclosure is directed to three-dimensional object printing systems and, more particularly, to systems and methods for forming three-dimensional objects on a rotating platen or cone.

BACKGROUND

Digital three-dimensional manufacturing, also known as digital additive manufacturing, is a process of making a three-dimensional solid object from a digital model of virtually any shape. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

In one form of three-dimensional object printing, a radial arm on which one or more printheads are mounted eject building or support material onto a rotating platen or cone to form the object. The printheads eject the material downwardly onto the platen or cone rotating with a constant angular velocity $\omega$. Because the outer perimeter of the rotating structure traverses a greater distance than the inner portions of the structure, the outer perimeter is traveling at a greater velocity than the inner portion. Since the inkjets in the printhead(s) are equally spaced at a distance $\Delta r$ along the radial arm and each inkjet along the radial arm fires an ink drop having a mass m at time intervals $\Delta t$, the density of a solid ring formed by each inkjet is a function of its position along the radial arm. Thus, the density of the ring is approximately $m/(r \Omega \Delta t \Delta r)$ since one can assume that $\Delta t$ and $\Delta r$ are both relatively small compared to r. The curvature effects from these parameters are second order variations. Consequently, the density of the solid object being formed varies primarily with the position of the inkjet along the radial arm.

One way of keeping the density constant for all inkjets along the radial arm would be to maintain the uniform radial spacing $\Delta r$ and fire the outer inkjets faster than the inner inkjets. This solution is not implemented in most inkjet printers, however, because inkjet printheads require a constant firing frequency for all inkjets in the printhead. Alternatively, image processing can be designed to compensate for the different radial positions and platen or cone speed differences by halftoning the image data to equalize the density of the material rings formed by the inkjets. This processing, however, wastes a significant amount of the throughput capability of the printheads and introduces various imaging artifacts.

Operating inkjet printers to reduce the variations in object material density caused by variations in the radial position of the inkjets would be beneficial.

SUMMARY

A three-dimensional object printer has been configured to maintain a consistent density for material ejected by inkjets along a radial arm in the printer. The three-dimensional object printer includes a platen configured to rotate about a center, a radial arm that extends from a position proximate the center of the platen to a position proximate a circumferential edge of the platen, at least one printhead mounted to the radial arm, the at least one printhead being configured to eject material onto the platen as the platen rotates past the at least one printhead, and a controller operatively connected to the at least one printhead and the platen, the controller being configured to rotate the platen, operate the at least one printhead to eject material onto the platen as the platen rotates past the at least one printhead, and move the at least one printhead along the radial arm between a position proximate the center of the platen to a position proximate the circumferential edge of the platen at a linear velocity that enables a product of a distance of the at least one printhead from the center of the platen and the angular velocity of the platen to remain constant as the at least one printhead moves between the position proximate the center of the platen and the position proximate the circumferential edge of the rotating platen.

Another embodiment of the three-dimensional object printer maintains the density at the outer portions of the platen by decreasing the distance between inkjets in printheads in the printer. The printer includes a platen configured to rotate about a center, a radial arm that extends from a position over the center of the platen to a position over a circumferential edge of the platen, at least one printhead mounted to the radial arm, the at least one printhead being configured to eject material onto the platen as the platen rotates past the at least one printhead, the at least one printhead being further configured with a linear array of inkjets, at least some inkjets in the linear array are separated from one another by a decreasing distance as the linear array of inkjets extends towards the circumferential edge of the platen, and a controller operatively connected to the at least one printhead and the platen, the controller being configured to rotate the platen, and operate the at least one printhead to eject material onto the platen as the platen rotates past the at least one printhead.

A method of operating a three-dimensional object printer has been developed that maintains a consistent density for material ejected by inkjets along a radial arm in the printer. The method includes rotating with a controller a platen about a center of the platen, operating with the controller at least one printhead to eject material onto the platen as the platen rotates past the at least one printhead, and moving with the controller at least one printhead along a radial arm that extends from a position over the center of the platen to a position over a circumferential edge of the platen, the controller moving the at least one printhead along the radial arm at a linear velocity that enables a product of a distance of the at least one printhead from the center of the platen and the angular velocity of the platen to remain constant as the at least one printhead moves to the circumferential edge of the rotating platen.

BRIEF DESCRIPTION OF THE DRAWINGS

The foregoing aspects and other features of an apparatus or printer that maintains a consistent density for material ejected by inkjets along a radial arm in the printer are explained in the following description, taken in connection with the accompanying drawings.

DETAILED DESCRIPTION

Figure 1:
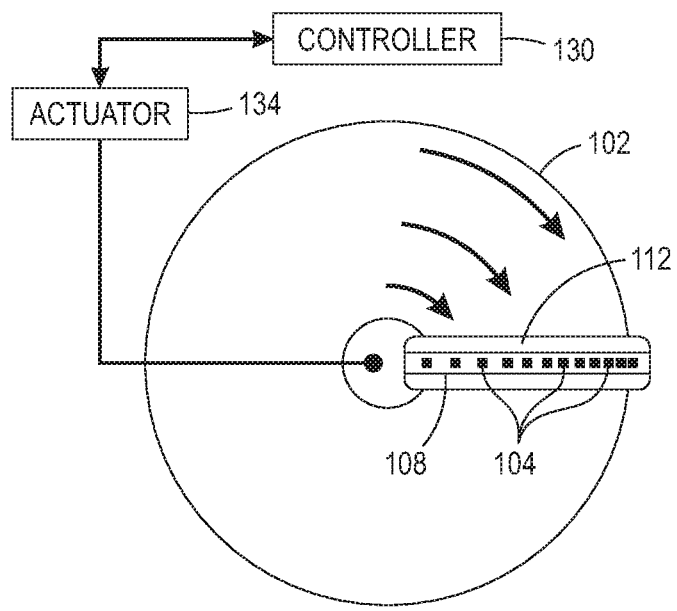
FIG. 1 is a diagram of a three-dimensional object printer having a printhead configured to produce a consistent density of material ejected onto a rotating platen from its center to its circumferential edge.

For a general understanding of the environment for the device disclosed herein as well as the details for the device, reference is made to the drawings. In the drawings, like reference numerals designate like elements.

As used herein, the term "build material" refers to a material that is ejected in the form of liquid drops from a plurality of ejectors in one or more printheads to form layers of material in an object that is formed in a three-dimensional object printer. Examples of build materials include, but are not limited to, thermoplastics, UV curable polymers, and binders that can be liquefied for ejection as liquid drops from ejectors in one or more printheads and subsequently hardened into a solid material that forms an object through an additive three-dimensional object printing process. In some three-dimensional object printer embodiments, multiple forms of build material are used to produce an object. In some embodiments, different build materials with varying physical or chemical characteristics form a single object. In other embodiments, the printer is configured to eject drops of a single type of build material that incorporates different colors through dyes or other colorants that are included in the build material. The three-dimensional object printer controls the ejection of drops of build materials with different colors to form objects with varying colors and optionally with printed text, graphics, or other single and multi-color patterns on the surface of the object.

As used herein, the term "support material" refers to another material that can be ejected from printheads during a three-dimensional object printing process to stabilize the object that is formed from the build material. For example, as the three-dimensional object printer applies layers of the build material to form the object, at least one printhead in the printer also ejects layers of the support material that engage portions of the object. The support material holds the previously formed layer of the build material in place, prevents newly formed features from breaking before sufficient build material is present to hold the object together, and prevents portions of the build material that have not fully solidified from flowing out of position before the hardening process is completed. Examples of support material include, but are not limited to, waxy materials that provide support to the object during the printing process and that can be easily removed from the object after the printing process is completed.

As used herein, the term "process direction" refers to a direction of movement of a platen past one or more printheads during a three-dimensional object formation process. The platen holds the three-dimensional object and accompanying support material during the print process. In some embodiments, the platen is a planar member or conical member that rotates adjacent to or beneath one or more printheads on a radial arm to support the formation of an object during the three-dimensional object printing process.

As used herein, the term "cross-process direction" refers to a direction that is perpendicular to the process direction and substantially parallel to the arrangement of at least some of the printheads that eject the drops of build material and support material to form the object. The ejectors in two or more printheads are registered in the cross-process direction to enable an array of printheads to form printed patterns of build material and support material over a two-dimensional planar region. During a three-dimensional object printing process, successive layers of build material and support material that are formed from the registered printheads form a three-dimensional object.

As used herein, the term "z-direction" refers to a direction of separation between the printheads in the three-dimensional object printer and the object and support material that are formed on the support member. At the beginning of the three-dimensional object printing process, the z-direction refers to a distance of separation between the support member and the printheads that form the layers of build material and support material. As the ejectors in the printheads form each layer of build material and support material, the z-direction separation between the printheads and the uppermost layer decreases. In many three-dimensional object printer embodiments, the z-direction separation between the printheads and the uppermost layer of printed material is maintained within comparatively narrow tolerances to enable consistent placement and control of the ejected drops of build material and support material. In some embodiments, the support member moves away from the printheads during the printing operation to maintain the z-direction separation, while in other embodiments the printheads move away from the partially printed object and support member to maintain the z-direction separation.

Figure 6:
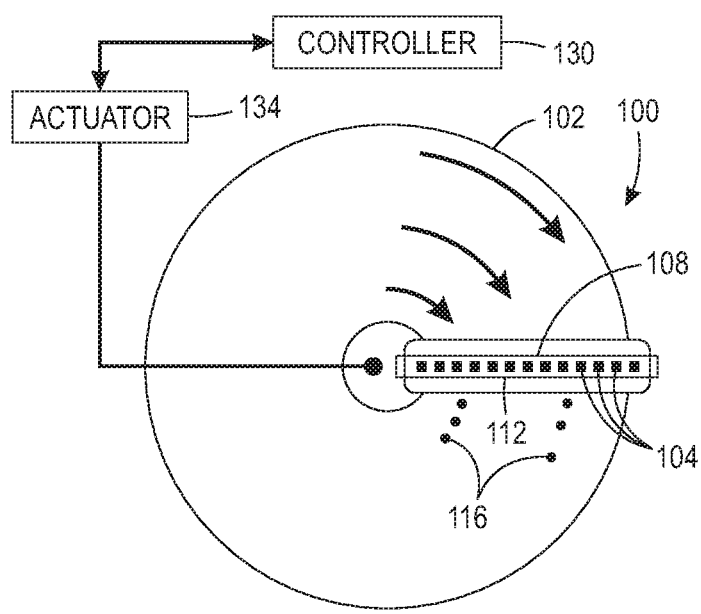
FIG. 6 is a diagram of a prior art three-dimensional object printer that illustrates the factors that vary the density of the material ejected by a printhead onto a rotating platen.

FIG. 6 depicts a prior art three-dimensional object printer 100 that demonstrates the inconsistent density arising from the radial arm configuration of the printheads. The printer 100 includes a rotating platen 102 and one or more printheads 112 mounted to a radial arm 108 that form a linear array of inkjets 104. The inkjets in the printhead 112 are a same distance from one another. A controller 130 is operatively connected to an actuator 134 to rotate the platen 102 at a predetermined angular velocity ω. As shown in FIG. 1, drops of material 116 ejected by the inkjets 104 nearer the outer end of the arm 108 are separated by a greater distance than the material drops 116 ejected by the inkjets nearer the origin of the radial arm at the center of the platen 102. The longer the radial arm is, the greater the discrepancy in the density of the lines formed by the inkjets along the length of the radial arm 108. Thus, the size of the objects that can be formed by the printer 100 is limited by the tolerance for the discrepancy in the density of the material in the object from the center to its periphery.

Figure 4:
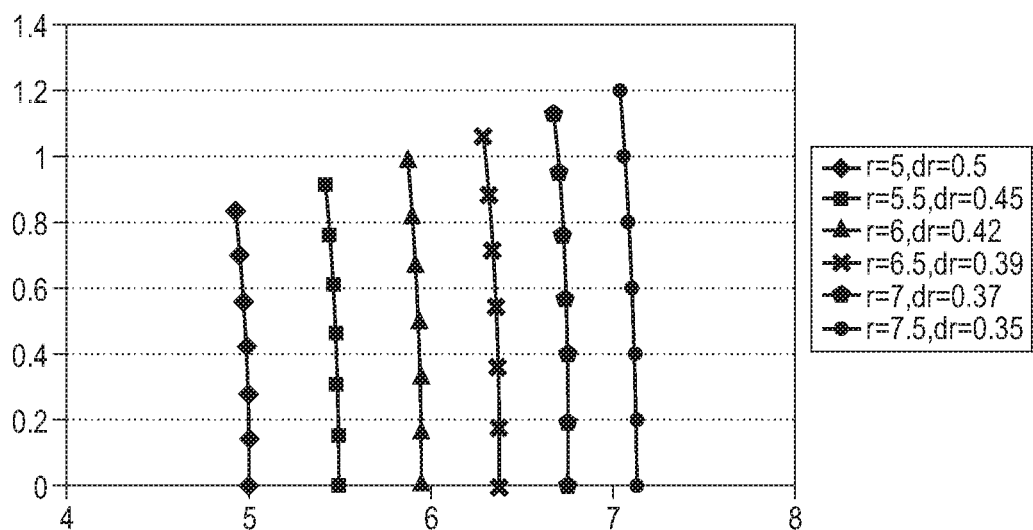
FIG. 4 is a graph of the positions at which inkjets in a printhead would fire to eject the drops in along a radial path.

The embodiment of an inkjet printer shown in FIG. 1 addresses the issue in density variation shown in FIG. 6. Again, the controller 130 operates the actuator 134 to rotate the platen 102 at a predetermined angular velocity ω. In this embodiment, the spacing between the inkjets 104 in the linear array of inkjets formed by the one or more printheads 112 mounted to the radial arm 108 is not the same distance. Instead, the inkjets nearer the outer end of the radial arm are positioned closer together than the inkjets nearer the center of the platen. This variation in the distance between inkjets enables the drops from the inkjets to remain aligned along a radial as shown in FIG. 4. In one embodiment, the inkjets along the inner half of the radial arm are separated by a distance corresponding to 300 dpi, while the inkjets along the outer half of the radial arm are separated by a distance corresponding to 600 dpi. In another embodiment, the distance between each inkjet varies with each inkjet being closer to the next adjacent inkjet towards the outer end of the radial arm than the inkjet is to the next adjacent inkjet towards the inner end of the radial arm.

Figure 2:
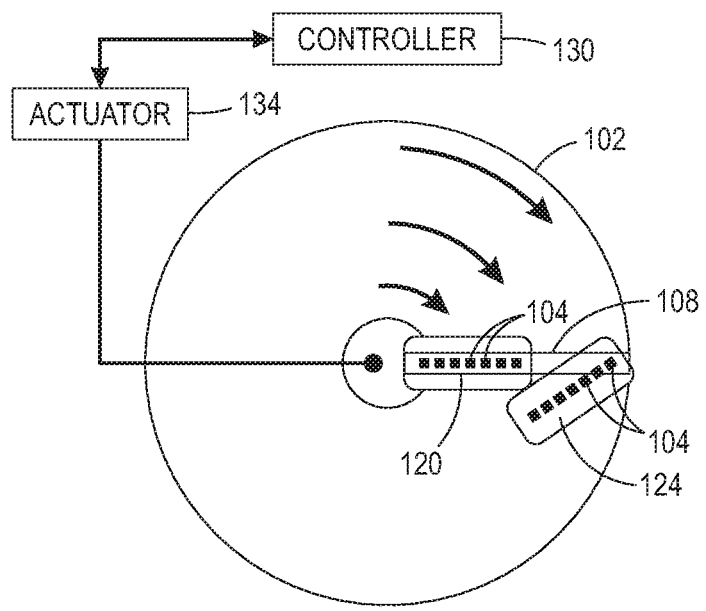
FIG. 2 is a diagram of another embodiment of a three-dimensional object printer having a printhead configured to produce a substantially consistent density of material ejected onto a rotating platen from its center to its circumferential edge.

In the embodiment shown in FIG. 2, the controller 130 operates the actuator 134 to rotate the platen 102 at a predetermined angular velocity ω. An inner printhead 120 is positioned to extend radially along the arm 108, and an outer printhead 124 is tilted at an angle with respect to the arm 108. The inkjets 104 in both printheads are separated by the same distance in the cross-process direction across the width of the printheads. By tilting the printhead 124 with respect to the radial arm 108, however, the inkjets in printhead 124 eject material drops closer to one another than they would if the printhead 124 was aligned radially with the arm 108.

Figure 3:
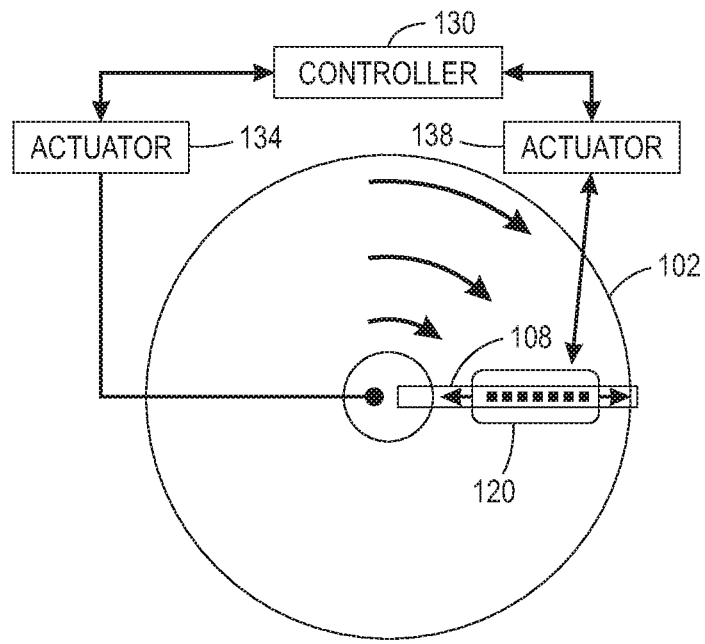
FIG. 3 is a diagram of another embodiment of a three-dimensional object printer configured to move the printhead between the center of the platen and its circumferential edge.

In the printer configuration of FIG. 3, the printhead 120 is mounted to the radial arm 108 and operatively connected to an actuator 138, which is operatively connected to the controller 130, to enable the controller 130 to move the printhead 120 radially along the arm 108 between the center of the platen 102 and its circumferential edge. Again, the controller 130 operates the actuator 134 to rotate the platen 102 at an angular velocity ω with reference to an electrical signal generated by the controller 130. As explained below, the controller is configured to (1) alter the angular velocity of the platen as the printhead 120 moves between the center of the platen and the circumference of the platen, (2) vary the linear speed of the printhead along the radial arm, or (3) alter the tilt of the printhead as it moves along the radial arm. Alternatively, the controller 130 can be configured to perform some combination of these operations to help maintain the density of the material rings being formed until the object formation is completed.

In the first type of operation, the controller 130 moves the printhead by operating the actuator 138 and as the printhead position changes, the controller operates the actuator 134 to vary the angular velocity of the rotating platen 102 with reference to the position of the printhead. This change in the angular velocity of the platen 102 enables the density of the material ejected by the printhead 120 to remain approximately constant. One way of maintaining a consistent density is to keep the product of the radial position r of the printhead along the arm 108 and the angular velocity ω of the platen a constant. Thus, as r increases with the outward movement of the printhead 120 along the radial arm 108, the controller reduces the angular velocity of the platen so the product of the new radial position and the new angular velocity is approximately equal to the product of the radial position at a prior position and previous angular velocity.

As used in this document with reference to the product noted above, the term "constant" means the product does not vary from one printhead location to another by an amount that is more than a ratio between the radii near the circumferential edge and near the center of the platen. This tolerable range in density arises from the printhead having a length in the radial direction. When the spacing between the inkjets is the same and the printhead is held at a particular location, the platen travels past the end of the printhead closest to the circumferential edge at a higher speed than the platen portion passing the end of the printhead closest to the center of the platen. Thus, the product being held "constant" refers to the radial distance and angular velocity product being such that the density of the material ejected at the end of the printhead at the circumferential edge of the platen approximates the density of the material ejected at the end of the printhead proximate the center of the platen. This approximate density, which does not exceed a ratio of the radii between the inner part of the printhead proximate the center of the platen and the outer part of the printhead proximate the circumferential edge, can be expressed as [(Outer radius/Inner radius)+1]/2. As used in this definition, the inner part refers to a portion closer to the center than the outer part. That is, the "inner" part does not necessarily have to be close to the center and the "outer" part is not required to be near the circumferential edge. Instead, one portion is relatively closer to the center than the other portion. Thus, the ratio of the outer radius to the inner radius can approach 1.

Figure 5:
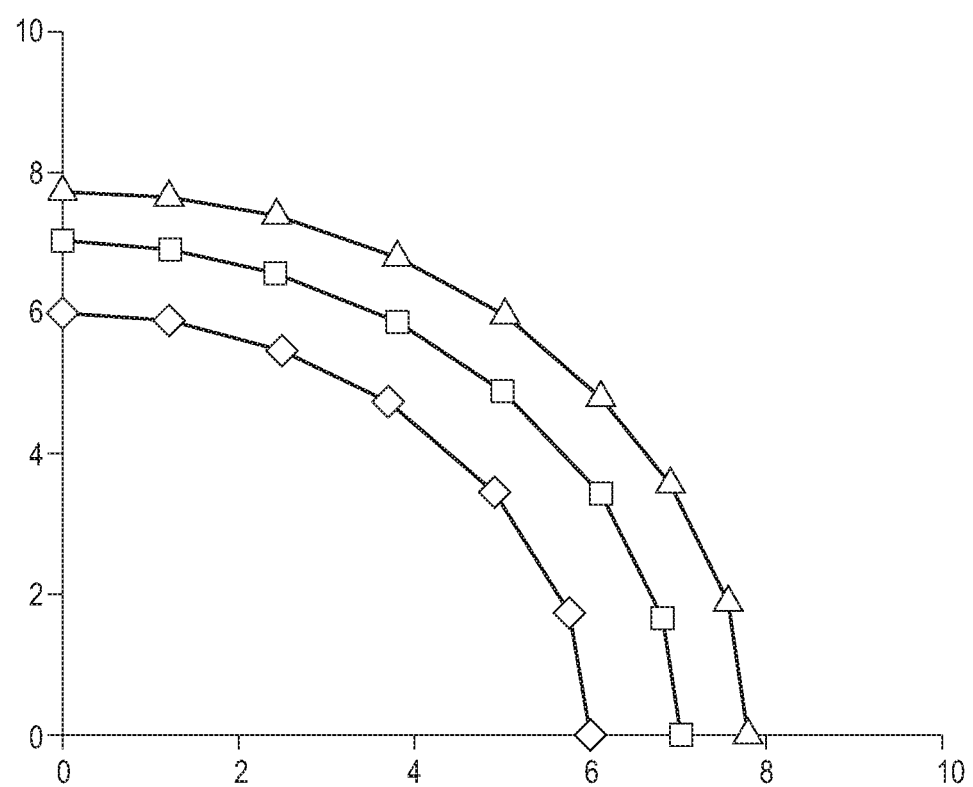
FIG. 5 is a graph of the positions at which inkjets in a printhead would fire to align the drops radially and provide more drops along each successive curve section.

In the second type of operation, the controller 130 is configured to vary a speed of the printhead 120 as it moves continuously along the radial arm 108. In this embodiment, the controller 130 operates the actuator 138 to vary the linear velocity of the printhead 120 along the radial arm 108 as the printhead moves along the radial arm between a position near the center of the platen to a position near the circumferential edge. Additionally, the controller 130 also operates the actuator 134 to maintain the angular velocity of the rotating platen 102 at the same speed. To implement this approach, the image data for the object to be printed by the three-dimensional object printer is processed into concentric cylinders in a known manner. The width of each cylinder and the number of dots per inch to be printed in the circumference of the cylinder is a function of the radial position of the printhead with reference to the center of the platen and the printer architecture. In a variation of this embodiment, the data for operating the at least one printhead is generated to enable a product of a radial position of a circumference of each cylinder and a change in circumference between a previous cylinder and a current cylinder to remain constant. The cylindrical rings decrease in width linearly as a function of the radial position of the printhead as in the case in which a single printhead spans the print zone from the center of the platen to its outer edge. In a printer having a single printhead that does not span the print zone across the platen 102 and that moves outwardly to eject material at positions to enable interleaving of the material drops, the angular velocity of the platen is varied in addition to the printhead radial velocity by using an average width for all of the concentric rings. A graph depicting this relationship in this embodiment of a three-dimensional object printer is shown in FIG. 5. As shown in the figure, not only do the ink drops align radially, as is the case in FIG. 4, but more drops are provided along each successive curve section.

In the third type of operation, the controller is configured to operate actuator 138 to tilt the printhead 120 as the controller moves the printhead along the radial arm 108 to change the effective distance between the drops ejected by the printhead. As already noted with reference to the embodiment in FIG. 1, this tilting of the printhead enables the material to be ejected from the printhead at a higher resolution than when the printhead is aligned with the radial arm.

In the three types of operation that move the printhead along the radial arm, the controller can move the printhead in a discrete manner, a continuous manner or a combination of those two movements. Also, as previously noted, the controller 130 can be configured to perform a combination of the three types of operation for moving the printhead along the radial arm. Additionally, the controller can be further configured to vary the angular velocity of the platen during these three types of operation or any combination thereof to help maintain a consistent density in the ejected material regardless of the location of the material on the platen.

In some embodiments, the controller 130 is configured to operate the platen and the printhead in an interleaved mode and in other embodiments, the controller 130 is configured to operate the platen in a single pass mode. In the interleaved mode, the controller 130 operates the actuator 138 to move the printhead 120 incrementally upon the completion of each platen revolution so any particular position on the platen can pass by the printhead more than once. This interleaved mode enables resolution of the material drops on the platen to be higher than is possible from the inkjet spacing in the printhead alone. In the single pass mode, the controller 130 operates the actuator 138 to move the printhead 120 so each position on the platen passes the printhead only once.

The operation of the printer has been described above with reference to the printhead being moved between a position proximate the center of the platen and a position proximate the circumferential edge of the platen. The reader should note that the controller 130 can be configured for bi-directional movement of the printhead. In general, the controller decreases the speed of the printhead and/or the angular velocity of the platen as the printhead travels outwardly from the center, and the controller increases the speed of the printhead and/or the angular velocity of the platen as the printhead travels inwardly towards the platen center. Thus, the controller 130 is configured to move the printhead and regulate the angular velocity of the platen and linear speed of the printhead as the printhead travels between the position proximate the center of the platen and the position proximate circumferential edge of the platen regardless of the direction in which the printhead is moving. Additionally, the controller can vary the tilt of the printhead to increase the resolution of the ejected drops as the printheads moves outwardly and to decrease the resolution as the printhead moves inwardly.

While the printer configurations described above reduce the difference in density between ink drops ejected closed to the inner end of the radial arm and those ejected closer to the circumferential edge, other techniques in the processing of the image data can further enhance this effect. For example, the rendered image data, such as halftone data, which is used to operate the printhead(s) on the radial arm can be manipulated to reduce the difference in density of the material on the platen between the inner and outer portions underlying the radial arm. Other rendered image data processing can be used as well to take advantage of the structural configurations described above.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A three-dimensional object printer comprising:
    a circular platen configured to rotate about a center of the platen;
    a first actuator operatively connected to the platen, the first actuator being configured to rotate the platen about the center of the platen;
    a radial arm that extends from a position opposite the center of the platen to a position opposite a circumferential edge of the platen, the radial arm being parallel to a planar surface of the platen that rotates about the center of the platen;
    at least one printhead mounted to the radial arm, the at least one printhead being configured to eject material onto the platen as the platen rotates past the at least one printhead, the at least one printhead being further configured with a linear array of inkjets, the inkjets in the linear array are separated from one another by a same distance;
    a second actuator operatively connected to the at least one printhead, the second actuator being configured to move the at least one printhead along the radial arm; and
    a controller operatively connected to the at least one printhead, the first actuator, and the second actuator, the controller being configured to:
        operate the first actuator to rotate the platen at different angular velocities with respect to a distance of the at least one printhead from the position opposite the center of platen and to operate the second actuator to move the at least one printhead along the radial arm at different speeds with respect to the distance of the at least one printhead from the position opposite the center of the platen; and
        operate the at least one printhead to eject material toward the platen as the platen rotates past the at least one printhead and the at least one printhead moves along the radial arm.

2. The three-dimensional object printer of claim 1, the controller being further configured to:
    operate the first actuator to change the angular velocity of the rotation of the platen to maintain a density of the material ejected onto a portion of the rotating platen nearer the center of the platen constant with a density of the material ejected onto a portion of the rotating platen nearer the circumferential edge of the platen.

3. The three-dimensional object printer of claim 1, the controller being further configured to:
    operate the first actuator to change the angular velocity of the rotation of the platen as the second actuator moves the at least one printhead between a position nearer the center of the platen and a position nearer the circumferential edge of the platen to maintain a product of a radial distance of the at least one printhead from the center of the platen and the angular velocity of the rotating platen constant as the at least one printhead moves between the position nearer the center of the platen and the position nearer the circumferential edge of the platen.

4. The three-dimensional object printer of claim 3, the controller being further configured to:
    operate the first actuator to increase the angular velocity of the rotation of the platen as the second actuator moves the at least one printhead from the position nearer the circumferential edge of the platen towards the position nearer the center of the platen to maintain the product of the radial distance of the at least one printhead from the center of the platen and the angular velocity of the platen constant as the at least one printhead moves towards the position nearer the center of the platen.

5. The three-dimensional object printer of claim 3, the controller being further configured to:
operate the first actuator to decrease the angular velocity of the rotation of the platen as the second actuator moves the at least one printhead from the position nearer the center of the platen towards the position nearer the circumferential edge of the platen to maintain the product of the radial distance of the at least one printhead from the center of the platen and the angular velocity of the platen constant as the at least one printhead moves towards the position nearer the circumferential edge of the platen.

6. The three-dimensional printer of claim 1, the controller being further configured to operate the second actuator to change a velocity of the at least one printhead along the radial arm as the at least one printhead moves along the radial arm; and
to operate the first actuator to rotate the platen at a same angular velocity.

7. The three-dimensional object printer of claim 6, the controller being further configured to:
operate the second actuator to move the at least one printhead along the radial arm between a position nearer the center of the platen and a position nearer the circumferential edge of the platen at a speed that enables a product of a radial distance of the at least one printhead from the center of the platen and an angular velocity of the platen to remain constant as the at least one printhead moves between a position nearer the center of the platen and a position nearer the circumferential edge of the platen.

8. The three-dimensional object printer of claim 7, the controller being further configured to:
operate the second actuator to reduce the speed of the at least one printhead as the at least one printhead moves towards the position nearer the circumferential edge of the platen to maintain the product of the radial distance of the at least one printhead from the center of the platen and the angular velocity of the platen constant as the at least one printhead moves towards the position nearer the circumferential edge of the platen.

9. The three-dimensional object printer of claim 7, the controller being further configured to:
operate the second actuator to increase the speed of the at least one printhead as the at least one printhead moves towards the position nearer the center of the platen to maintain the product of the radial distance of the at least one printhead from the center of the platen and the angular velocity of the platen constant as the at least one printhead moves towards the position nearer the center of the platen.

10. The three-dimensional object printer of claim 1, the second actuator being further configured to rotate the at least one printhead with respect to the radial arm and the controller being further configured to operate the second actuator to rotate the at least one printhead to change an angle between the at least one printhead and the radial arm.

11. The three-dimensional object printer of claim 10, the controller being further configured to:
operate the second actuator to rotate the at least one printhead with respect to the radial arm to increase an angle between the at least one printhead and the radial arm as the at least one printhead moves towards the circumferential edge of the platen.

12. The three-dimensional object printer of claim 10, the controller being further configured to:
operate the second actuator to rotate the at least one printhead with respect to the radial arm to decrease an angle between the at least one printhead and the radial arm as the at least one printhead moves towards the center of the platen.

13. The three-dimensional object printer of claim 6, the controller being further configured to:
generate data for operating the at least one printhead from image data corresponding to an object to be produced by the three-dimensional object printer, the data for operating the at least one printhead corresponding to a plurality of cylinders concentric with the center of the platen; and
operate the at least one printhead with reference to the generated data.

14. The three-dimensional object printer of claim 13, the controller being further configured to:
generate the data for operating the at least one printhead to make a product of a radial position of a circumference of each cylinder and a change in circumference between a previous cylinder and a current cylinder a constant.

15. The three-dimensional object printer of claim 1, the at least one printhead being configured as at least two printheads mounted to the radial arm, the inkjets within each of the at least two printheads being separated from one another in a direction aligned with the radial arm by a same distance, one of the at least two printheads being nearer the center of the platen and being aligned with the radial arm and another of the least two printheads being nearer the circumferential edge and being positioned at an angle with reference to the radial arm so the inkjets in the other printhead nearer the circumferential edge eject material drops at a density constant with a density for the material drops ejected by the printhead nearer the center of the platen.

* * * * *